United States Patent
Pohl et al.

(10) Patent No.: US 7,226,020 B2
(45) Date of Patent: Jun. 5, 2007

(54) APPARATUS FOR DRIVING AND ADJUSTING FLAPS HINGED TO AN AIRCRAFT

(75) Inventors: Ulrich Pohl, Bremen (DE); Carsten Thomas, Bremen (DE); Christian Lulla, Bremen (DE); Martin Kloenne, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 105 days.

(21) Appl. No.: 11/021,723

(22) Filed: Dec. 22, 2004

(65) Prior Publication Data

US 2005/0151028 A1  Jul. 14, 2005

(30) Foreign Application Priority Data

Dec. 23, 2003  (DE) ................. 103 61 891

(51) Int. Cl.
 B64C 3/58  (2006.01)
(52) U.S. Cl. ..................................... 244/213
(58) Field of Classification Search ........ 244/213–215, 244/99.2–99.4
 See application file for complete search history.

(56) References Cited

U.S. PATENT DOCUMENTS

| | | | |
|---|---|---|---|
| 2,295,306 A | | 9/1942 | Tampier |
| 2,403,577 A | * | 7/1946 | Breltweiser .................. 318/41 |
| 2,696,954 A | * | 12/1954 | Harmon et al. ............. 244/203 |
| 3,662,550 A | * | 5/1972 | Lichtfuss ..................... 60/405 |
| 3,986,689 A | | 10/1976 | Maltby |
| 4,256,277 A | | 3/1981 | Embree |
| 4,260,121 A | | 4/1981 | Baston et al. |
| 4,441,675 A | * | 4/1984 | Boehringer et al. ........ 244/213 |
| 4,533,096 A | * | 8/1985 | Baker et al. ................ 244/75.1 |
| 4,575,027 A | | 3/1986 | Cronin |
| 4,688,744 A | | 8/1987 | Aldrich |
| 4,715,567 A | | 12/1987 | Poccard |
| 4,765,568 A | | 8/1988 | Carl et al. |
| 4,779,822 A | | 10/1988 | Burandt et al. |
| 4,786,013 A | * | 11/1988 | Pohl .......................... 244/99.2 |
| 4,892,274 A | | 1/1990 | Pohl et al. |
| 4,964,599 A | | 10/1990 | Farineau |
| 5,743,490 A | | 4/1998 | Gillingham et al. |
| 6,200,223 B1 | | 3/2001 | Martens |
| 6,257,528 B1 | | 7/2001 | Brislawn |
| 6,481,667 B1 | | 11/2002 | Ho |
| 6,739,550 B2 | | 5/2004 | Koizumi et al. |
| 6,755,375 B2 | | 6/2004 | Trikha |
| 6,824,099 B1 | * | 11/2004 | Jones ...................... 244/99.12 |

(Continued)

FOREIGN PATENT DOCUMENTS

EP   1 038 765   9/2000

*Primary Examiner*—Teri Pham Luu
*Assistant Examiner*—Stephen A Holzen
(74) *Attorney, Agent, or Firm*—W. F. Fasse; W. G. Fasse

(57) ABSTRACT

Flaps, for example leading edge flaps and/or trailing edge flaps of an aircraft wing, are driven and adjusted by respective drive units. Drive shafts of neighboring flaps are coupled to each other by a differential gear. The differential gear is thus coupled to a main drive shaft which is driven by a main drive unit. Additionally, the differential gear is coupled to a secondary drive unit. The main drive power and the secondary drive power and thus the respective flap motions are super-imposable on each other, which permits operating the flaps independently of each other or in synchronism with each other.

5 Claims, 1 Drawing Sheet

U.S. PATENT DOCUMENTS

| | | |
|---|---|---|
| 7,048,234 B2 * | 5/2006 | Recksiek et al. ............ 244/213 |
| 7,051,975 B2 * | 5/2006 | Pohl et al. .................. 244/213 |
| 2004/0200928 A1 | 10/2004 | Degenholtz et al. |
| 2005/0029407 A1 | 2/2005 | Pohl et al. |
| 2005/0151027 A1 * | 7/2005 | Recksiek et al. ........... 244/241 |

* cited by examiner

APPARATUS FOR DRIVING AND ADJUSTING FLAPS HINGED TO AN AIRCRAFT

CROSS-REFERENCE TO RELATED APPLICATIONS

This application is related to U.S. application Ser. No. 10/868,175 filed on Jun. 14, 2004, now issued as U.S. Pat. No. 7,051,975 on May 30, 2006, and U.S. application Ser. No. 10/812,507 filed on Mar. 29, 2004, now issued as U.S. Pat. No. 7,048,234 on May 23, 2006.

PRIORITY CLAIM

This application is based on and claims the priority under 35 U.S.C. §119 of German Patent Application 103 61 891.0, filed on Dec. 23, 2003, the entire disclosure of which is incorporated herein by reference.

FIELD OF THE INVENTION

Flaps that are hinged to an aircraft, particularly to a lift producing component of an aircraft, such as a wing are operated by respective drive units connected to the flaps through drive shafts integrated into the respective aircraft component.

BACKGROUND INFORMATION

Drive units for aircraft flaps connected to the leading and/or trailing edges of an aircraft wing convert a rotational movement into a translatory motion, whereby all drive shafts are coupled to a central drive.

Landing flaps hinged to the trailing edge of a wing and flaps for changing the aircraft wing cross-sectional configuration, such as leading edge flaps hinged to the leading edge of the wing, are conventionally operated by devices comprising a central drive unit operating two rotational shaft drives or drive trains for a left and a right aircraft wing. Such drive units further comprise a plurality of decentralized individual drive units with corresponding operating mechanisms. The central drive unit produces a rotational motion which is transmitted through the shaft drive train to the individual drive units allocated to the individual flaps. These individual drive units convert the initial rotational motion into a translatory motion which is transmitted to the respective operating mechanism which in turn operates the respective flaps as desired. In order to assure a uniform and synchronous operation of all flaps, it is conventional to connect all flaps of a wing with a common rotational shaft drive train. In ths context the term "flap" includes leading edge flaps and/or trailing edge flaps, whereby the latter may also be referred to as landing flaps.

It is, however, desirable to achieve an adjustment or positioning of individual flaps independently of the adjustment of any other flaps. Such independent or individual flap adjustments have aerodynamic advantages depending on any particular flight phase. These advantages include, for example the possibility of influencing a lift distribution over the wing span width, controlling air vortex formations caused by the wings, and an ability to compensate for asymmetric aircraft configurations. Such an asymmetric aircraft configuration may, for example, occur when an aircraft engines fails. The individual flap control permits counteracting the mentioned asymmetric situations by generating an oppositely effective lift asymmetry to thereby restore the desired symmetry of the aircraft control.

For reasons inherent in the flight mechanics it is generally necessary to provide for a symmetric position adjustment at the left and right aircraft wing. More specifically, flaps must be operated in pairs to achieve symmetric control configurations. Thus, the adjusted positions of the individual flaps at the left and right wing must be symmetric for pairs of flaps. However, under special flight conditions or for special applications it may be suitable and even necessary to establish non-symmetric or asymmetric flap position configurations.

Conventional control mechanisms of this type leave room for improvement with regard to the independent adjustment of individual flaps since conventionally such adjustments are generally not possible. However, devices are known which rely on a redundancy or multiplication of certain elements for a mechanical decoupling of different components of these devices to achieve a flap displacement individually and independently of any displacements of other flaps. However, such devices require the duplication of the number of drive units and of the rotational shaft drive trains. This duplication of components has a decoupling effect so that inner and outer pairs of flaps may be individually operated. Such redundant drive mechanism is known for example from the aircraft type Boeing B747. These known mechanisms make it possible to operate pairs of flaps symmetrically and independently of an operation of other flap pairs. More specifically, these known drives permit the symmetric adjustment of pairs of flaps as well as an asymmetric independent adjustment.

Moreover, it is known to have decentralized flap drive units which are mechanically decoupled from one another for operating individual flaps including landing flaps and/or leading edge flaps.

The redundancy of drive components required for the above conventional flap drives is a considerable disadvantage since the multitude of drive units including rotational shaft drive trains increases the weight of the aircraft due to the installation of a second central drive unit with its drive train and diverse additional gears and drive shafts which also require additional space and makes installation difficult. Moreover, drive mechanisms with decentralized individual drives that are mechanically decoupled from one another have the disadvantage that when dimensioning these drives the designer must take into account that any one of these individual drives may fail. This requirement normally leads to over-dimensioning these redundant drives which in turn results in heavier drive elements.

OBJECTS OF THE INVENTION

In view of the foregoing it is the aim of the invention to achieve the following objects singly or in combination:
to provide a simple drive concept for aircraft flaps which results in a flap drive mechanism of a relatively small weight while still permitting to individually or independently position the flaps during different flight phases;
to construct an aircraft flap drive mechanism with a main drive unit and an auxiliary drive unit in such a way that the motions generated by the two drives can be superimposed on one another; and
to control the flap motions symmetrically individually or in pairs and/or asymmetrically so that the flaps may be operated in accordance with current flight phase requirements and in response to flap position information processed in a computer for providing respective flap position control signals.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved according to the invention in that the drive shafts of neighboring flaps are coupled to each other by a differential gear which is coupled by a main drive shaft to a central main drive and by a secondary drive train to a secondary drive. The main drive shaft has two sections one of which is driven through the differential gear, while the other main drive shaft section is directly driven by the main drive. Due to the coupling of the differential gear to the secondary drive the motions of the two drive trains as generated by the central drive unit and by the secondary drive unit are superimposed on one another for an individual, independent flap drive or a synchronized drive in unison.

The additional differential gear permits generating an r.p.m. difference between the r.p.m.s of neighboring flaps, whereby a different adjustment is individually possible for each flap of a pair.

A symmetric adjustment of flaps on both aircraft wings is achieved by a centralized secondary drive for the flaps of both aircraft wings with a respectively allocated differential gear for the symmetric positioning of flaps on both wings.

In another embodiment of the invention secondary drives are provided for the flaps on each aircraft wing, whereby a computer is used for a symmetric positioning of the flaps of a pair in an open loop control. In a further preferred embodiment position sensors ascertain the position of individual flaps on each wing and provide these signals to a computer for controlling the respective secondary drives in response to position signals from said position sensors for a closed loop control. The computer is preferably equipped with a program having a tuned or adapted synchronizing algorithm.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
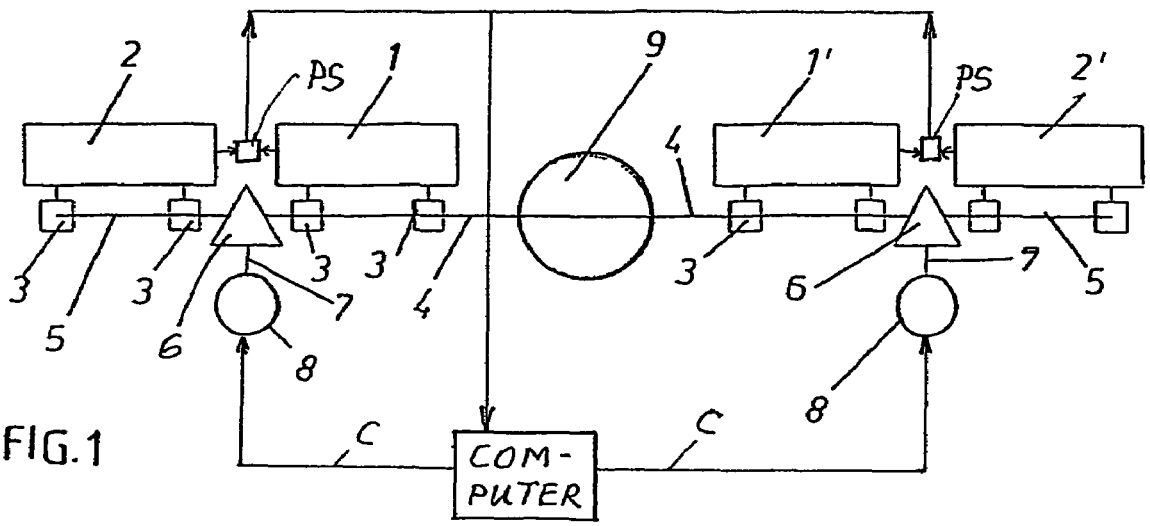
FIG. 1 illustrates schematically the arrangement of a differential gear in the main drive shaft between two flaps, wherein the flaps on each wing are also coupled to an individual secondary drive through the respective differential gear.

FIG. 1 shows schematically a pair of flaps 1 and 2 secured to the left wing of an aircraft while a pair of flaps 1' and 2' are secured to the right wing of an aircraft. The wings are not shown. Each flap 1, 2, 1' and 2' is driven through, for example, two allocated drives or actuators 3 such as gears coupled to a main drive shaft 4 or drive train driven by a main or primary central drive 9 provided in common for driving the flaps of both wings. The main drive shaft 4 is coupled to further drive shaft sections 5 through respective differential gears 6. One secondary drive 8 is provided for each wing. The secondary drives 8 are coupled through respective drive trains 7 to the corresponding differential gear 6. A brake, not shown, is preferably provided for each of the secondary drives 8.

Figure 3:
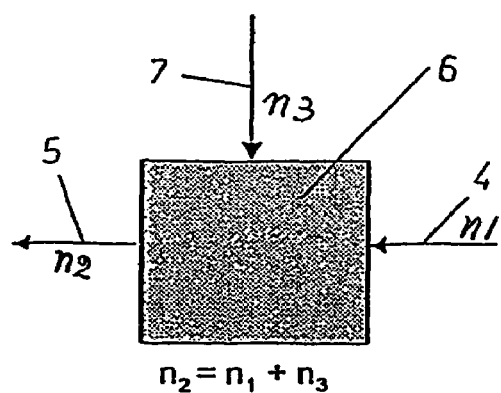
FIG. 3 is a principle block diagram of a differential gear with its inputs and output to show the r.p.m. relationship.

The r.p.m. of the drive shaft 4 is determined by the given input r.p.m. of the central main drive 9. The r.p.m. of the further drive shaft 5 coupled to the drive shaft 4 through the differential gear 6 is determined by the input r.p.m. of the drive shaft 4 and by the r.p.m. of the drive train 7 connecting the secondary drive 8 to the respective differential gear, please see FIG. 3. The r.p.m. n2 of the shaft section 5 is the sum of the r.p.m.s n1+n3 at the drive inputs 4 and 7 of the differential gear 6.

FIG. 1 further shows a computer having an input connected to position sensors PS that ascertain the individual positions of the flaps 1, 2, 1' and 2'. The computer has outputs connected through conductors C to the secondary drives 8 for controlling the secondary drives in response to positional signal information received from the position sensors PS, thereby providing a closed loop control.

According to the invention the individual angular positions of neighboring flaps 1, 2, 1', 2' are determined by the different r.p.m.s of the drive shafts 4 and 5 as a function of time and are further influenced by the respective secondary drive 8.

A suitable secondary drive 8 may, for example, be a locally positioned duplex electric motor with a reduction gear and with a torque limiter for limiting the load applied to the differential gear 6. Other locally positioned drives may be used, for example a simplex electric motor or a hydraulic motor. Further, it is also possible to provide a one-sided fixing of the differential gear by a passivated secondary drive. More specifically, a passive brake is used to passivate the respective passive drive, for example a constant friction device or an active brake such as a power off brake may be used for controlling the secondary drives 8.

In order to prevent an asymmetric adjustment of the flaps 1, 2 and 1' and 2' in response to the occurrence of an error or failure, a holding device may be used, for example, when a drive shaft 4, 5 should brake. Such holding devices are either passive brakes provided at the drive units or active brakes may be used for the individual drive shafts 4, 5.

By providing each wing side with a locally positioned secondary drive 8, it becomes possible to independently position the flaps 1, 2 and 1', 2' in pairs and in a symmetric manner as well as in an asymmetric manner.

The above mentioned computer shown in FIG. 1 is used to symmetrically position the flaps in pairs with the help of a synchronizing algorithm. The computer receives position information containing signals from the position sensors PS of the individual flaps or pairs of flaps on the right wing and on the left wing in order to control the r.p.m. of the individual secondary local drives 8 in a closed loop fashion.

Figure 2:
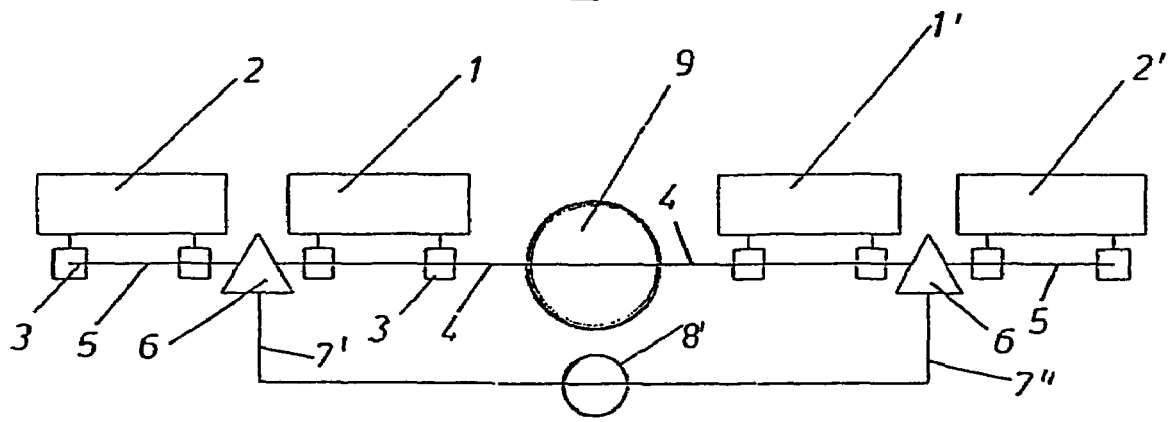
FIG. 2 illustrates an embodiment with one central secondary drive for the differential gears on both wings.

An open loop control is also possible from the cockpit. FIG. 2 illustrates the use of at least one single secondary drive 8' for both wings, whereby the differential gears 6 are provided individually and locally for each pair of flaps. A drive train 7' connects the left wing differential gear 6 to the single secondary drive 8'. A drive train 7" connects the right wing differential gear 6 also to single secondary drive 8'. In this embodiment the flaps can be operated individually, however only in pairs and symmetrically relative to the flap pair on each wing. This embodiment is simpler than the embodiment of FIG. 1, however at the expense of not providing a symmetrical closed loop positioning of individual flaps.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for driving and positioning flaps operatively secured to a left wing and to a right wing of an aircraft, said apparatus comprising a pair of left wing flaps (1, 2) and a pair of right wing flaps (1', 2'), each pair of flaps including an inner flap closer to a body of said aircraft and an outer flap further away from said body, at least one actuator (3) operatively connected to each inner and outer wing flap of each pair, a primary drive (9) provided in common for the flaps of both wings, inner drive shafts (4) connecting said primary drive (9) to said at least one actuator (3) of said inner flap of each pair of flaps, a first differential gear (6) operatively interposed between said at least one actuator (3) of said inner flap (1) and said at least one actuator (3) of said outer flap (2) of said pair of left wing flaps, a second differential gear (6) operatively interposed between said at least one actuator of said inner flap (1') and said at least one actuator of said outer flap (2') of said pair of right wing flaps, outer drive shafts (5) connecting said first and second differential gears (6) to said at least one actuator of said inner flap and to said at least one actuator of said outer flap of each pair of flaps (1, 2; 1', 2'), wherein said inner drive shafts (4) couple said primary drive (9) and said first and second differential gears (6) to each other, wherein each of said outer flaps (2, 2') of each pair of flaps is drivable through its respective differential gear (6) of said first and second differential gears, at least one secondary drive (8'), and secondary drive trains operatively connecting said at least one secondary drive (8') to each of said first and second differential gears (6) for superimposing a rotation of said at least one secondary drive (8') through said first and second differential gears (6) on a rotation of said primary drive (9).

2. The apparatus of claim 1, comprising two secondary drives (8), one secondary drive for each pair of said wing flaps (1, 2; 1', 2'), said secondary drive trains coupling a respective secondary drive of said two secondary drives to a respective differential gear (6) of said differential gears.

3. The apparatus of claim 1, further comprising a computer for producing a control signal, flap position sensors providing flap position information to said computer for generating said control signal in response to said flap position information, and a control signal connection (C) between said computer and said at least one secondary drive for symmetrically operating said flaps in response to said control signal.

4. The apparatus of claim 3, wherein said flap position sensors are adapted for sensing a position representing value for each individual flap of each wing.

5. The apparatus of claim 3, wherein said computer comprises a program with a tuned algorithm for synchronizing the driving of said flaps.

* * * * *